United States Patent [19]

Anandan et al.

[11] Patent Number: 5,708,324
[45] Date of Patent: Jan. 13, 1998

[54] FLUORESCENT LAMP WITH DIFFERENT DENSITY PHOSPHOR COATINGS ON THE FRONT PANEL AND INTERNAL CHANNELS

[75] Inventors: Munisamy Anandan, Burlington; Jakob Maya, Brookline, both of Mass.

[73] Assignee: Matsushita Research and Development Laboratory Inc., Woborn, Mass.

[21] Appl. No.: 627,905

[22] Filed: Mar. 18, 1996

[51] Int. Cl.[6] ........................................ H01J 63/04
[52] U.S. Cl. .................... 313/493; 313/485; 313/635
[58] Field of Search ................................ 313/484, 485, 313/487, 489, 490, 493, 113, 634, 635

[56] References Cited

U.S. PATENT DOCUMENTS

| | | | |
|---|---|---|---|
| 2,405,518 | 8/1946 | Polevitzky | 176/122 |
| 2,406,146 | 8/1946 | Holmes | 176/122 |
| 2,501,376 | 3/1950 | Breadner et al. | 176/122 |
| 2,555,749 | 6/1951 | Krefft | 313/109 |
| 3,043,983 | 7/1962 | Ray | 313/221 |
| 3,247,415 | 4/1966 | Martyny | 313/109 |
| 3,258,630 | 6/1966 | Scott | 313/109 |
| 3,646,383 | 2/1972 | Jones et al. | 313/109 |
| 4,839,555 | 6/1989 | O'Mahoney | 313/493 |
| 5,041,762 | 8/1991 | Hartai | 315/169.3 |

*Primary Examiner*—Sandra L. O'Shea
*Assistant Examiner*—Vip Patel

[57] ABSTRACT

A flat compact fluorescent lamp is disclosed. The lamp contains a fill of mercury and inert gas. The lamp includes a glass front panel (1) having an inner surface and a glass bottom panel (2) also having an inner surface. A convoluted glass partition (3) having an eccentric spiral shape and smooth bends is disposed between the inner surfaces of the front and bottom panels and with the bottom panel (2) defines a channel (4) in the lamp. The channel (4) has a fairly uniform width. A phosphor coating (6) of a predetermined density between about 3 and 5 mg./cm$^2$ is disposed on the inner surface of the channel (4) and a phosphor coating (8) of a predetermined density of between about 0.5 and 1.5 mg./cm$^2$ is disposed on the inner surface of the front panel (1). Two electrodes (14a & 14b) are disposed at opposite ends of the spiral in the lamp to form an arc which emits UV light to excite the phosphor (6 & 8) to emit light. Substantially all the light emerging from the phosphor 6 on the channel (4) passes through the thinner phosphor (8) coating on the front panel (1).

19 Claims, 3 Drawing Sheets

FLUORESCENT LAMP WITH DIFFERENT DENSITY PHOSPHOR COATINGS ON THE FRONT PANEL AND INTERNAL CHANNELS

CROSS-REFERENCE TO RELATED APPLICATIONS

In U.S. Ser. No. 08/291,887, filed Aug. 17, 1994, by Maya et al., a disclosure is made of a "Substantially Flat Compact Fluorescent Lamp." In U.S. Ser. No. 08/452,312, filed May 26, 1995, by Anandan et al., disclosure is made of "A Method of Manufacturing Substantially Flat Compact Fluorescent Lamp." In U.S. Ser. No. 08/599,389, filed Feb. 9, 1996, by Maya et al., entitled "Flat Compact Florescent Lamp with Inter-Channel Discharge Suppression," a disclosure is made of improvements in the construction of such lamps. Each of these applications is assigned to the same assignee as the present application.

BACKGROUND OF THE INVENTION

1. Field of the Invention

The present invention relates to improvements in substantially flat compact fluorescent lamps, and especially to fluorescent lamps having at least one convoluted channel formed by a convoluted partition disposed between a pair of substantially flat panels. Preferably, the channel is molded as one part of one of the panels and forms an integral part of the panel. The other panel is sealed to the periphery of the partition forming the channel to form an envelope.

2. Description of the Prior Art

Conventional fluorescent lamps have an elongated tubular envelope construction with electrodes disposed at either end. When a potential is imposed upon the electrodes, mercury ions and excited mercury atoms form and produce ultraviolet light which in turn excites a phosphor coating to emit visible light. A recent improvement in fluorescent lamps is a so-called compact fluorescent lamp. Such compact fluorescent lamps are fabricated by bending a tubular glass envelope into a U-shape, or even bending it several times to form quadruple U-shapes. Since the brightness of the fluorescent lamp is dependent upon the length of the envelope, such complex bending operations are necessary to obtain a high light output. Even with complex bending, the compact fluorescent lamps tend to be rather long and require external fixtures, especially when they are employed for uses which require directionality. Moreover, compact fluorescent lamps can operate at excessively high temperatures which produce high mercury vapor pressures beyond the optimum value needed for maximum lumen efficiency. Such high operating temperatures can also reduce the life of the components of the lamp.

Lamps in the form of flat panels with channels in them are well known to the art. For example, U.S. Pat. No. 2,405,518, to Polevitzky, discloses a molded cup formed of a ceramic, plastic or stamped metal. A spiral partition is disposed within the cup and electrodes are placed at each end of the spiral partition. A glass cover or top panel is disposed over the face of the chamber formed by the cup and is hermetically sealed to a flange to provide a closure. Other patents related to flat fluorescent lamps include the U.S. Pat. No. 2,406,146, to Holmes, wherein a fluorescent lamp with a spiral channel discharge is disclosed. In the U.S. Pat. No. 2,501,376, to Breadner et al., an opposing spiral channel discharge is disclosed. The Krefft patent, U.S. Pat. No. 2,555,749, also discloses a channel fluorescent lamp. The U.S. Pat. No. 3,247,415, to Martyny, discloses a fluorescent panel lamp in which internal partitions were pressed with low pressure under heat. U.S. Pat. No. 3,258,630, to Scott, discloses a channel discharge lamp with a sinuous path.

It is well known in the florescent lamp art that the density of the phosphor coating generally must be controlled to provide maximum luminosity from the lamp. Moreover, it is also known in the fluorescent lamp art, as disclosed by U.S. Pat. No. 3,043,983, to Ray, to provide an uncoated stripe on a tubular envelope so that light emitted by the phosphor coating can pass through the stripe on the glass unimpeded by the phosphor, whereby to enhance brightness. A reflective coating is applied behind the phosphor layer such that most of the radiation escapes through the stripe and the light is directed toward the object being illuminated. Such lamps are fairly efficient in collimating the radiation in one direction.

SUMMARY OF THE INVENTION

The present invention relates to substantially flat compact fluorescent lamps, and especially to fluorescent lamps having at least one convoluted channel formed by a convoluted partition disposed between a pair of substantially flat panels. Preferably, the channel is molded into one of the panels and forms an integral part of the panel. The other panel is sealed at the periphery of the partition forming the channel to form an envelope.

Typically, in tubular fluorescent lamps ultraviolet (UV) radiation which is produced inside the tube goes in all directions with equal probability. To utilize all available UV photons, the phosphor should be placed on the inner walls of the tubes in uniform thickness. The amount of phosphor coating is carefully optimized because if the phosphor coating is too thin then all UV photons will not be effectively utilized, thereby reducing the efficiency of the lamp. On the other hand, if the phosphor coating is too thick the visible radiation generated by the innermost portion of the phosphor layer will be absorbed by the portion of the layer adjacent the glass of the envelope, thereby reducing the efficiency of the lamp. At the same time the cost of the lamp is increased because of an excessive amount of phosphor.

In broadest aspects, the present invention relates to a flat compact fluorescent lamp which contains a fill of mercury and an inert gas. The lamp includes a front panel and a bottom molded part, including a bottom panel with an integral convoluted glass partition disposed between the front and the bottom panel. The partition is arranged as a convoluted channel, preferably in a spiral shape with a substantially uniform width throughout its length. A phosphor coating of predetermined density is disposed on the front panel and another phosphor coating, also of predetermined density, is disposed on the convoluted channel. The density of the phosphor coating on the front panel is significantly less than the density of the coating on the convoluted channel. Preferably, the predetermined density of the phosphor coating on the channel is between about 3 and 5 mg/cm$^2$, and the predetermined density of the phosphor on the inner surface of the front panel is between about 0.5 and 1.5 mg/cm$^2$.

When flat compact fluorescent lamps are operated, such as disclosed in the above mentioned application of Ariandan et al., Ser. No. 08/452,312, the edge of the partition abutting the inner surface of the front panel can be seen through the front panel as a spirally-shaped dark area. Since it is necessary for the width of the edges of the partition to be between 2 and 3 mm to prevent the arc within one channel from arcing across to an adjacent channel, these darker areas will be visible. Reduction of the dark areas is important. We have also found that if the inner surface of the top panel is either sandblasted or coated with a silica film (or both of these techniques), the observability of the dark areas can be reduced. Thus, the lamp has an appearance of being all white and of uniform intensity wherein the channels and electrodes will not be visible from the outside of the lamp.

In a further aspect, the invention relates to a flat compact fluorescent lamp wherein the configuration of the convoluted channel is designed to take advantage of the low operating voltage of the lamp whilst preventing the formation of dark areas in certain regions of the lamp. The regions not occupied by a discharge are cooler than the regions which are occupied and the cooler regions start to accumulate mercury and mercuric compounds during operation of the lamp which produces a non-uniform intensity of light.

DESCRIPTION OF THE PREFERRED EMBODIMENTS

In the typical manufacture of fluorescent lamps having tubular shapes it is well known to use phosphor coating densities in the order of 4 mg/cm$^2$ of surface. Such coating densities are especially useful for tricalcium phosphate phosphors. They provide the maximum luminosity as a function of cost of the phosphor. The coverage on the inside of the fluorescent lamp is substantially uniform around the walls. As mentioned previously, in some applications a strip of the phosphor is removed. With such lamps it is conventional to place a reflective coating behind the phosphor such that the radiation passes through the slit and is directed on the work being illuminated.

Referring now to FIG. 1, the lamp of the present invention is especially useful in down-light illumination. We have found illumination from flat fluorescent lamps provides very high brightness per unit surface area on the illuminated surface. In such lamps the arc discharge goes from the periphery to the center or from one side of the periphery to the other side of the periphery depending upon the particular spiral configuration of the discharge which generates the UV photons. These UV photons have equal probability, as mentioned above, to be emitted in all the directions in any kind of a cross-sectional area of a lamp.

Figure 1A:
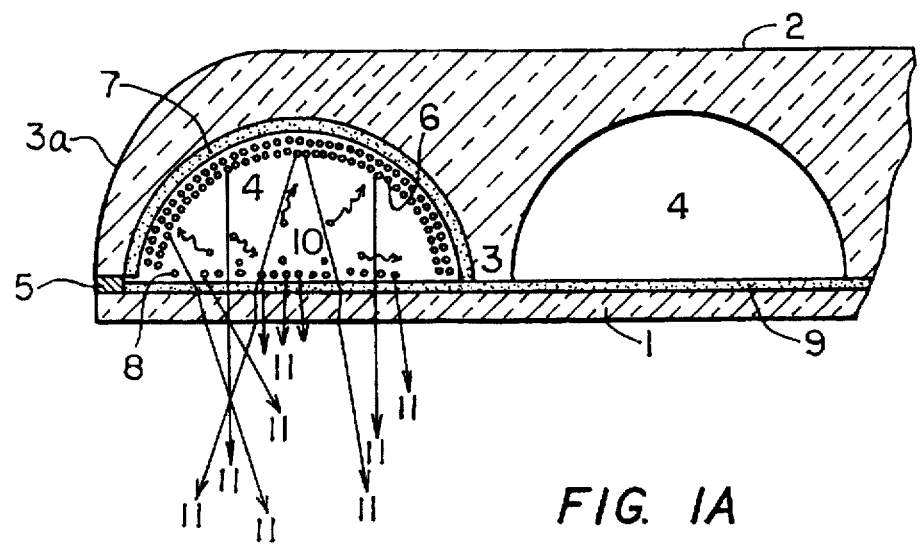
FIGS. 1A, 1B, 1C are fragmentary cross-sectional views of a flat compact fluorescent lamp showing different density distributions of phosphor on the inner surface of the front panels of the lamps.
Figure 1B:
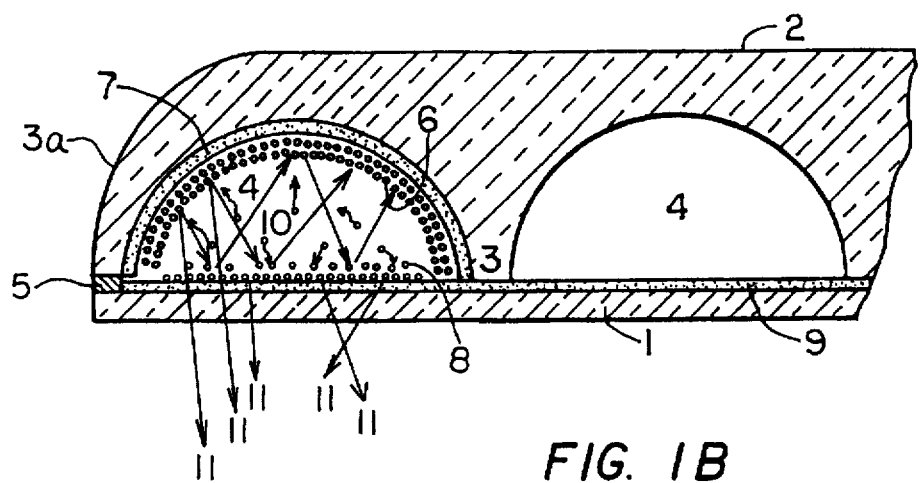
Figure 1C:
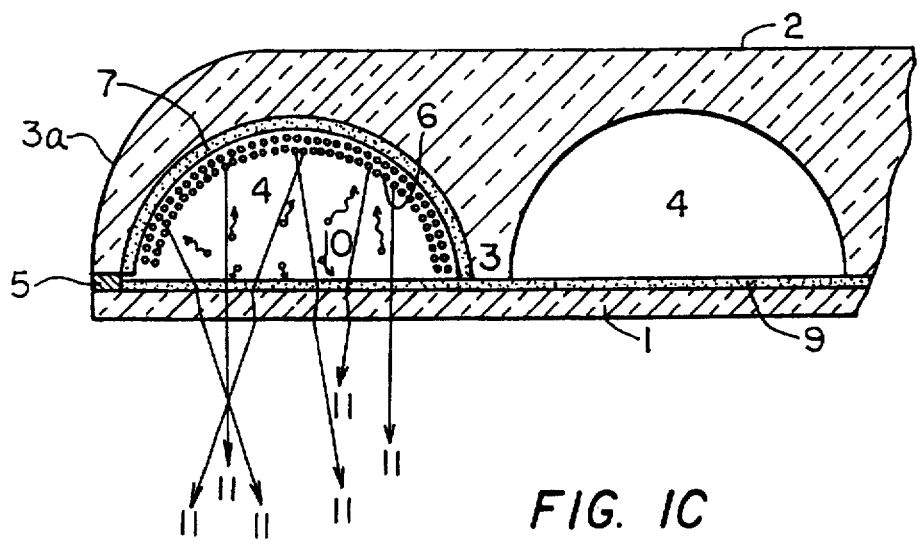

Referring to FIGS. 1A, 1B and 1C, fragmentary portions of flat compact fluorescent lamps are shown. The lamp has a front panel 1 and a bottom molded part 2 comprising a bottom panel and an integrally formed partition 3. The partition 3 forms channels 4. Front panel 3 is joined to the bottom molded part 2 by a frit seal 5 disposed on an outermost ring 3a. In the embodiment shown, the partition 3 is integrally formed with the bottom molded part 2, however, in some cases the structure can be derived by sandwiching the convoluted partition 3 within two panels to form the channels 4 between them.

Upon operation of the lamp an arc is formed and contained by channel 4. The arc produces UV photons which in turn energize a phosphor layer 6 coated upon the interior of the channel 4. For simplicity of explanation the phosphor layer is shown only in the outermost portion of the channel 4, although it is to be understood all of the channel 4 is coated. To direct the maximum amount of light emitted by the phosphor through front panel 1, a reflective coating 7 having a preferred surface density between about 6 and 9 mg/cm$^2$ is disposed upon the interior of the channel 4 between the phosphor layer 6 and the walls of the channel 4. In the preferred embodiment a protective, barrier layer 9 of aluminum oxide having a surface density between about 0.2 and 0.3 mg/cm$^2$ is disposed upon the front panel 1 to prevent darkening of the interior of the panel by the amalgamation of mercury ions and components of the glass, such as soda lime.

Referring to FIG. 1C, where there is no phosphor coating on the interior surface of the front panel 1, a photon of light is schematically represented at 10 as a circle with an arrowhead. The arrowhead depicts the direction of movement of the photon. As can be seen, some of the arrowheads are directed to the interior of the channel 4 where they will excite the phosphor 6 to produce light. It can also be seen that some of the arrowheads are directed toward the front panel 1 where they will be absorbed by the glass and produce no visible radiation. On the other hand, photons which excite phosphors will cause the phosphor to emit visible light, as indicated by the straight arrows 11.

Turning to FIG. 1B, photons 10 again excite the phosphor 6 in the lamp. FIG. 1B differs from FIG. 1C in that there is a coating 8 of phosphor on the interior of the front panel 1. The density of the phosphor layer 8 on the front panel 1 is substantially the same as the density of the phosphor 6 on the channel 4. As shown, when a UV photon excites the phosphor 6, only some of the visible light will be transmitted through the front panel 1. Some of the visible light that is emitted from the phosphor layer 6 encounters particles of the phosphor layer 8 and are reflected back to the phosphor layer 6. Some will be absorbed by the phosphor layer. Of course, some of the visible light emerging from the phosphor layer 6 will pass through phosphor layer 8 and be emitted from the lamp. Other photons are shown with arrowheads pointing toward the phosphor layer 8. They excite the phosphor 8 and cause the layer also to emit visible light from the lamp.

We have found, as shown in FIG. 1A, the use of a conventional density of phosphor 6 on the channel 4 can be combined with a significantly reduced density of phosphor 8 on the inner surface of the panel 1 to appreciably enhance visible radiation from the lamp. Photons which encounter the phosphor layer 6 on the channel 4 will produce radiation which can pass through the thin layer of phosphor 8 on the inner surface of the front panel 1 without significant reflection or absorption. Also, photons which are depicted as pointing towards the phosphor 8 on the front panel 1 can excite the phosphor and cause it to emit visible light 11 in combination with visible light emitted from the phosphor 6.

Figure 3A:
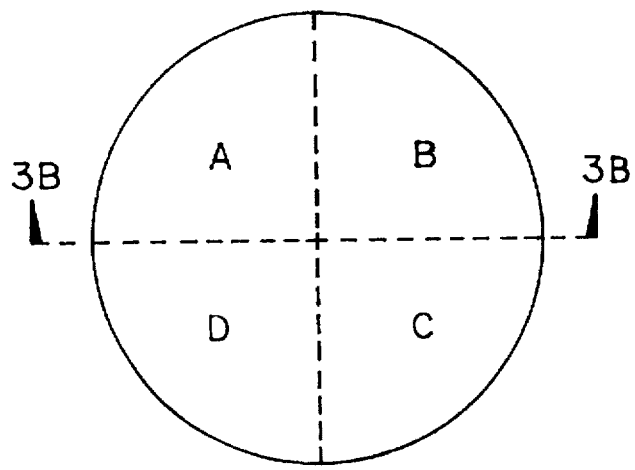
FIG. 3A is a front view of a compact flat fluorescent lamp divided into four quadrants which are coated with different densities of fluorescent material.
Figure 3B:
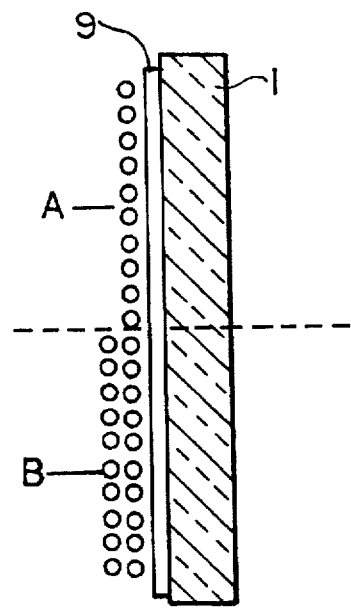
FIG. 3B is a cross-sectional view taken along the line 3B—3B of FIG. 3A.
Figure 3C:
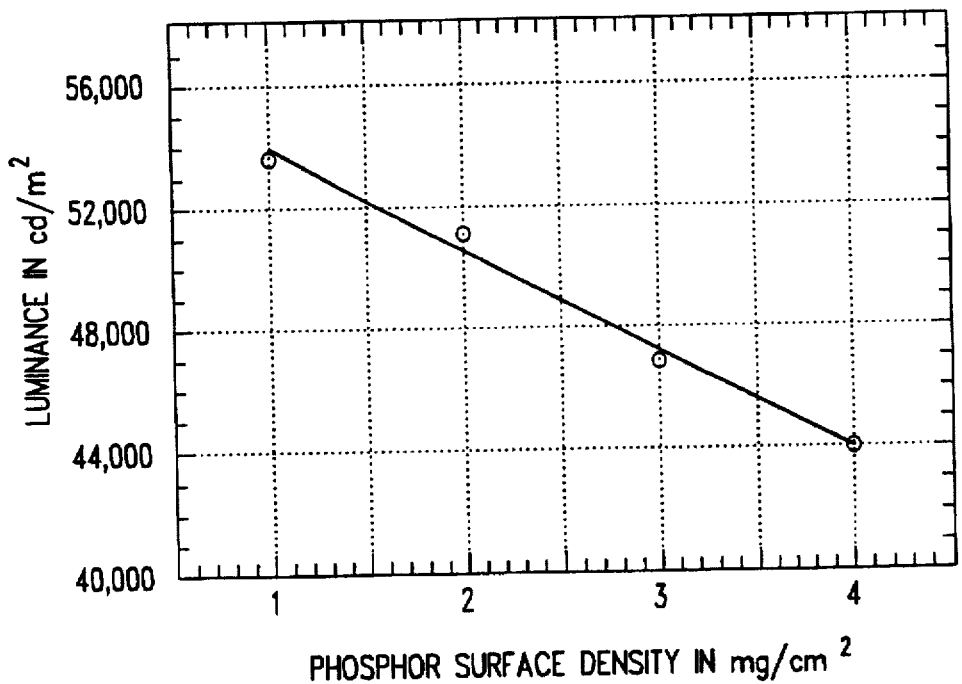
FIG. 3C is a curve showing the luminosity in each of the quadrants of the lamp in FIG. 3A and comparing luminosity to phosphor surface density.

Turning to FIG. 3A, a front surface of a compact fluorescent lamp is shown as divided into four quadrants (A, B, C, D). In order to determine the density of phosphor which is necessary to provide the maximum luminosity per square meter of surface, the brightness of the front surface of a lamp was measured. Quadrant A was covered with 1 mg/cm$^2$ of phosphor, quadrant B had 2 mg/cm$^2$, quadrant C had 3 mg/cm$^2$, and quadrant D had 4 mg/cm$^2$. As shown in FIG. 3B, the phosphor layer (A and B) was laid over a thin, protective layer of aluminum oxide that was coated as a barrier layer on the inside surface of front plate 1. The measured luminosity is the light provided by both the phosphor coating on the channel plus light which is produced by the phosphor on the inner surface of the front panel. The phosphor coating on the channel was uniform throughout the lamp. Only the density of the phosphor on the inner surface of the front panel was varied. The density in quadrant D is equal to the density of phosphor disposed upon the channel, that is, a conventional density for a conventional fluorescent lamp. The results of the study are shown in FIG. 3C in which quadrant A produced significantly more light per square meter than any of the other quadrants. Based on the trend of the curve, optimum coverage for the coating density on the lamp is between about 0.5 and 1.5 mg/cm$^2$. Even with the very thin coating on the inner surface of the front panel illustrated in quadrant A, it was found the lumen maintenance of the quadrant did not show any particular adverse effect because of the reduced coverage of the phosphor, especially when the inner surface of the front panel was first covered with the thin protective layer of fine particulate material, such as, aluminum oxide, titanium oxide, yttrium oxide, and similar oxides which are well known in the art, to form a barrier between the mercury ions and the glass. While such covering can produce a transmission loss when using a conventional particle size of less than about a micron, the transmission loss is less than about 1%. The covering, however, prevents amalgams from darkening the glass to reduce the effectiveness of the phosphor and to reduce the transmission of visible light. As can be seen with the results in quadrants B, C and D, the luminosity is significantly reduced as the density of the phosphor is increased.

Figure 2A:
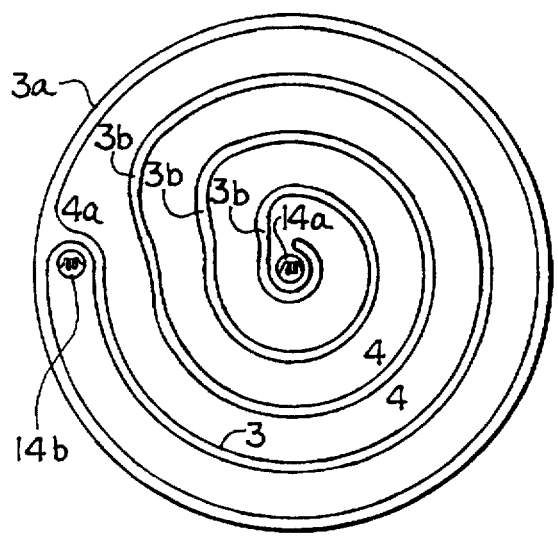
FIGS. 2A, 2B and 2C are different embodiments of the shape of the concentric partitions forming the channels.
Figure 2B:
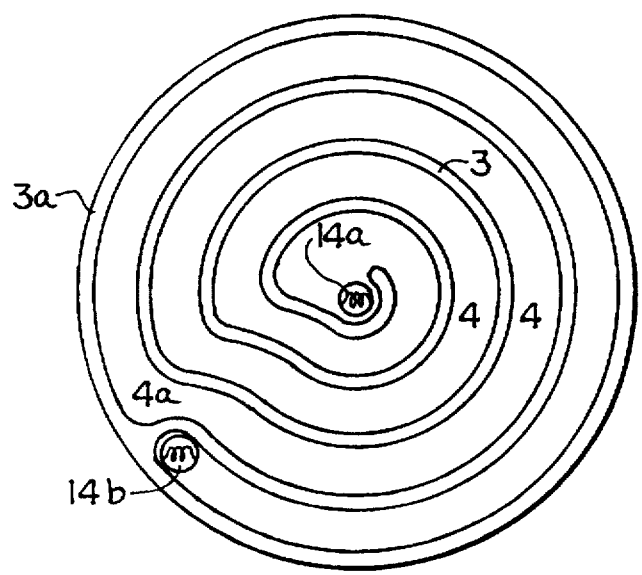
Figure 2C:
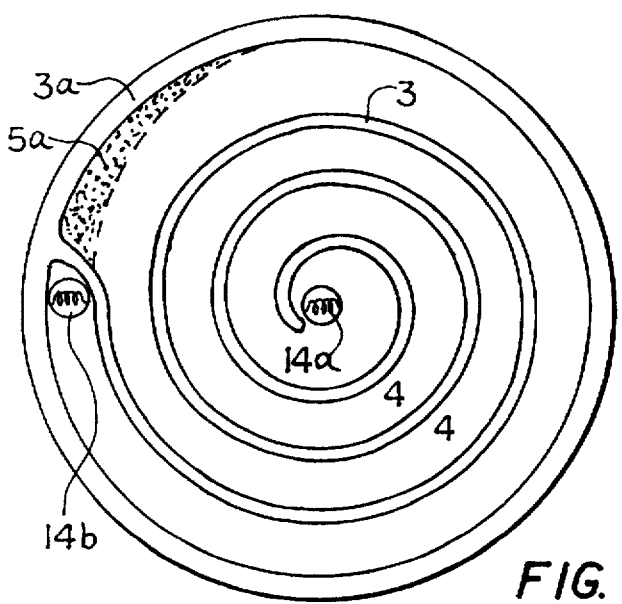

Turning now to FIGS. 2A, 2B and 2C, different embodiments of the shape of the spiral glass partition are shown. Each of the embodiments has an outer ring portion 3a. The ring portion 3a is used to seal the partition to the front panel 1 (not shown in this view). The frit used for sealing the components is placed upon the top of the circular outer ring portion 3a and fired to form a hermetically-sealed envelope. Electrodes 14a and 14b are disposed in wells in the lamp. Electrode 14a is centrally located in the lamp at the initial end of the channel 4 formed by the partition 3. Electrode 14b is disposed at the terminal end of the channel, adjacent ring 3a.

In FIG. 2C the partition is exactly spirally-shaped, that is, the spacing between the various segments of the partition is identical, except where the partition 3 is adjacent to the outer ring portion 3a. We have found when the lamp illustrated in FIG. 2C is operated, the discharge does not hug the wall adjacent the outer ring portion 3a. These points become relatively cold, dark regions where mercury can accumulate, and if there is some slight impurity in the lamp, the mercury tends to recombine with oxygen or water vapor to form mercury oxide. Eventually, some of the mercury oxide will darken the areas 5a during the operation of the lamp over a period of time.

Referring to FIG. 2B, an embodiment is shown in which the width of the channels is substantially uniform throughout the entire length of the spiral partition. Such uniform width is provided by narrowing the channel 4 between the electrode 14b and the section of the partition immediately adjacent it. In this way, the uniform spiral shape is distorted to maintain the uniform width of the channel 4. The spiral has significant sharp kinks. Such kinks, however, introduce high lamp voltages at the kinks at the locations indicated with arrowheads. We found forming the channels with an equal width and having the spiral take a sharp bend eliminated the cold region and the accumulation of mercury at the outer peripheral region 5a of FIG. 2C, but the discharge did not hug the entire channel and the sharp corners indicated by arrowheads were areas where the discharge did not encounter the wall and provided a mercury accumulation which created black dark spots which were not optically pleasing in a lamp.

In FIG. 2A the width of the outer channel is reduced from that shown in FIG. 2C, but the sharp corners shown in FIG. 2B were eliminated. In this way, the discharge will meet the entire front surface of the front panel to result in a uniform appearance. The rounded corners 3b provide a reduction in the width of the outer channel 4a without a sharp corner where the discharge would heat the entire channel near region 3b and 4b, producing uniform illumination. Moreover, with the embodiment shown in FIG. 2A there are no cold spots for mercury to accumulate and lead to dark spot formation.

Since aesthetics are an important part of illumination with a lamp, it is desirable to remove as much as possible any dark spirals due to the partitions. We found elimination of the dark spirals can be further enhanced by sand-blasting or depositing a silica film upon the inner surface of the front panel 1. The sandblasting or silica deposition (or both) of the inner surface of the front panel reduces the visibility of the channels and provides a more uniform light distribution. The light intensity with the flat compact fluorescent lamp of the present invention has been found to be extremely bright. We found that glare from such a bright light source is better diffused with silica film and/or sandblasting, and results in a reasonably bright uniform radiation that is aesthetically pleasing. The lamp has a fairly uniform appearance across its surface during operation.

A reduced density coverage of the inner surface of the front panel can be accomplished in a variety of ways, preferably a spray or a couple of drops of slurry can be dropped in the center of the front panel. The panel is spun at a high speed to provide uniform distribution of the droplets. We prefer to spray-coat the phosphor on the front panel and adjust the viscosity so at a given distance, at a given speed of spray-coating, the coverage was at a desired surface density. Other manufacturing techniques for applying phosphors to the remainder of the lamp are well known in the art.

While it is apparent that changes and modifications can be made within the spirit and scope of the present invention, it is our intention, however, only to be limited by the scope of the appended claims. As our invention we claim:

1. A flat compact fluorescent lamp containing a fill of mercury and inert gas, said lamp comprising:

a glass front panel having an inner surface and a glass bottom panel also having an inner surface;

a convoluted glass partition disposed between said inner surfaces of said front and bottom panels, said partition with said bottom panel forming a channel having an initial and a terminal end;

means to seal the peripheral portion of said partition to the inner surface of said front panel, said sealing means forming a sealed envelope with said front and bottom panels;

a phosphor coating on the inner surface of said channel, said coating being of predetermined density;

a phosphor coating on the inner surface of said front panel, said coating being of predetermined density, said density being significantly less than the density of the coating on said channel;

at least two electrode means for said lamp, one of said electrode means being disposed at the initial end of said convolution and the other being disposed at the terminal end, whereby to emit radiation and excite said phosphor to emit light, substantially all the light emerging from the coating on said channel passing through the coating of phosphor on said front panel.

2. The lamp according to claim 1 wherein said predetermined density of the phosphor on said channel disposed on said bottom panel is between about 3 and 5 mg./cm$^2$.

3. The lamp according to claim 1 wherein said predetermined density of the phosphor on the inner surface of said front panel is between about 0.5 and 1.5 mg./cm$^2$.

4. The lamp according to claim 1 wherein said predetermined density of the phosphor on said channel is between about 3 and 5 mg./cm$^2$ and the predetermined density of the phosphor on the inner surface of said front panel is between about 0.5 and 1.5 mg./cm$^2$.

5. The lamp according to claim 1 wherein a reflective coating is disposed between said phosphor coating on said channel and said channel.

6. A flat compact fluorescent lamp containing a fill mercury and inert gas, said lamp comprising:

a glass front panel having an inner surface and a glass bottom panel also having an inner and an outer surface, said inner surface of said front panel being either sandblasted or coated with a film of silica or both;

a convoluted glass partition disposed between said inner surfaces of said front and bottom panels, said partition with said bottom panel forming a channel having an initial and a terminal end, observation of the definition of said partition from said outer surface being reduced by said sandblasting or with a silica film when the lamp is operating;

means to seal the peripheral portion of said convoluted partition to the inner surface of said front panel, said sealing means forming a sealed envelope with said front and bottom panels;

a phosphor coating on the inner surface of said channel, said coating being of predetermined density;

a phosphor coating on the inner surface of said front panel, said coating being of predetermined density, said density being significantly less than the density of the coating on said channel;

at least two electrode means for said lamp, one of said electrode means being disposed at the initial end of said convolution and the other being disposed at the terminal end, whereby to emit radiation and excite said phosphor to emit light, substantially all the light emerging from the coating on said channel passing through the coating of phosphor on said front panel.

7. The lamp according to claim 6 wherein said predetermined density of the phosphor on said channel is between about 3 and 5 mg./cm$^2$.

8. The lamp according to claim 6 wherein said predetermined density of the phosphor on the inner surface of said front panel is between about 0.5 and 1.5 mg./cm$^2$.

9. The lamp according to claim 6 wherein said predetermined density of the phosphor on said channel is between about 3 and 5 mg./cm$^2$ and the predetermined density of the phosphor on the inner surface of said front panel is between about 0.5 and 1.5 mg./cm$^2$.

10. The lamp according to claim 6 wherein a reflective coating is disposed between said phosphor coating on said channel and said channel.

11. The lamp according to claim 6 wherein said convoluted channel is spiral in shape, said channel having a substantially uniform width throughout its length whereby to provide substantial uniform temperature in said channel to inhibit deposition of mercury and mercury compounds.

12. A flat compact fluorescent lamp containing a fill mercury and inert gas, said lamp comprising:

a glass front panel having an inner surface and a glass bottom panel also having an inner and an outer surface, said inner surface being either sandblasted or having a film of silica or both;

a convoluted glass partition disposed between said inner surfaces of said front and bottom panels, said partition with said bottom panel forming a convoluted channel having an initial and a terminal end, observation of the definition of said partition from said outer surface being reduced by said sandblasting or said film of silica when the lamp is operating;

means to seal the peripheral portion of said convoluted partition to the inner surface of said front panel, said sealing means forming a sealed envelope with said front and bottom panels;

a phosphor coating on the inner surface of said convoluted channel, said coating being of predetermined density;

a phosphor coating on the inner surface of said front panel, said coating being of predetermined density, said density being significantly less than the density of the coating on said convoluted channel said predetermined density of the phosphor on said channel being between about 3 and 5 mg./cm$^2$ and said predetermined density of the phosphor on the inner surface of said front panel being between about 0.5 and 1.5 mg./cm$^2$.;

at least two electrode means for said lamp, one of said electrode means being disposed at the initial end of said convolution and the other being disposed at the terminal end, whereby to emit radiation and excite said phosphor to emit light, substantially all the light emerging from the coating on said channel passing through the coating of phosphor on said front panel.

13. The lamp according to claim 12 wherein a reflective coating is disposed between said phosphor coating on said channel and said channel.

14. The lamp according to claim 12 wherein said convoluted channel is spiral in shape, said channel having a substantially uniform width throughout its length whereby to provide substantial uniform temperature in said channel to inhibit deposition of mercury and mercury compounds.

15. A flat compact fluorescent lamp having a generally circular viewable face and containing a fill mercury and inert gas, said lamp comprising:

a generally circular glass front panel having an inner surface and a generally circular glass bottom panel also having an inner surface;

a spiral glass partition disposed between said inner surfaces of said front and bottom panels, said partition being integrally molded to said bottom panel, said partition being formed of a circular outer ring portion and an inner convoluted portion, said partition forming a spiral channel having an initial end and a terminal end and a housing for an electrode means disposed at said initial end and said terminal end, said channel having a substantially uniform width throughout its length and being formed eccentrically with a series of smooth, gradual lobes commencing in the first convolution of the partition and extending outwardly through successive convolutions and terminating within said outer ring portion;

means to seal the ring portion of said convoluted partition to the inner surface of said front panel, said sealing means forming a sealed envelope with said front and bottom panels;

a phosphor coating on the inner surface of said convoluted channel and a phosphor coating on the inner surface of said front panel, the coating on said front panel being of predetermined density, said density being significantly less than the density of the coating on said convoluted channel;

an electrode means for said lamp disposed in each of said housings to ionize and excite the mercury and produce photons to excite the phosphor.

16. The lamp according to claim 15 wherein said predetermined density of the phosphor on said channel is between about 3 and 5 mg./cm$^2$.

17. The lamp according to claim 15 wherein said predetermined density of the phosphor on the inner surface of said front panel is between about 0.5 and 1.5 mg./cm$^2$.

18. The lamp according to claim 15 wherein said predetermined density of the phosphor on said channel is between about 3 and 5 mg./cm$^2$ and the predetermined density of the phosphor on the inner surface of said front panel is between about 0.5 and 1.5 mg./cm$^2$.

19. The lamp according to claim 15 wherein the temperature within the length of the channel is substantially uniform because of the shape of said smooth, gradual lobes whereby to prevent the deposition of darkening mercury oxides on colder locations in said lamp.

* * * * *